(12) United States Patent
Ho et al.

(10) Patent No.: US 9,549,064 B2
(45) Date of Patent: Jan. 17, 2017

(54) SYSTEM AND METHOD TO CUSTOMIZE A TELEPHONE

(75) Inventors: Chi Fai Ho, Palo Alto, CA (US); Shin Cheung Simon Chiu, Palo Alto, CA (US)

(73) Assignee: TP Lab Inc., Palo Alto, CA (US)

( * ) Notice: Subject to any disclaimer, the term of this patent is extended or adjusted under 35 U.S.C. 154(b) by 1400 days.

(21) Appl. No.: 11/510,917

(22) Filed: Aug. 28, 2006

(65) Prior Publication Data

US 2008/0063171 A1    Mar. 13, 2008

(51) Int. Cl.
*H04M 3/42*    (2006.01)
*H04M 1/247*   (2006.01)

(52) U.S. Cl.
CPC ....... *H04M 3/42153* (2013.01); *H04M 1/2471* (2013.01); *H04M 3/42068* (2013.01); *H04M 3/42178* (2013.01); *H04M 2201/38* (2013.01); *H04M 2201/40* (2013.01)

(58) Field of Classification Search
USPC .......... 379/210.02, 201.01, 207.02; 709/204, 709/224; 455/456.1
See application file for complete search history.

(56) References Cited

U.S. PATENT DOCUMENTS

| | | | | |
|---|---|---|---|---|
| 5,761,288 A * | 6/1998 | Pinard et al. | ............ | 379/201.03 |
| 6,988,126 B2 * | 1/2006 | Wilcock et al. | ............ | 709/204 |
| 7,555,721 B2 * | 6/2009 | Wassom et al. | ............ | 715/745 |
| 7,676,498 B2 * | 3/2010 | England et al. | ....... | 707/999.107 |
| 7,787,489 B2 * | 8/2010 | Caulfield et al. | ............ | 370/463 |
| 2002/0095312 A1 * | 7/2002 | Wheat | ............ | 705/1 |
| 2002/0107920 A1 * | 8/2002 | Hotti | ............ | H04L 67/306 709/204 |
| 2002/0120849 A1 * | 8/2002 | McKinley | ........ | G06F 17/30817 713/176 |
| 2002/0147801 A1 * | 10/2002 | Gullotta et al. | ............ | 709/223 |
| 2002/0156904 A1 * | 10/2002 | Gullotta et al. | ............ | 709/229 |
| 2002/0161612 A1 * | 10/2002 | Jurden | ............ | 705/7 |
| 2003/0156700 A1 * | 8/2003 | Brown et al. | ............ | 379/210.02 |
| 2004/0122941 A1 * | 6/2004 | Creamer et al. | ............ | 709/224 |
| 2005/0078620 A1 * | 4/2005 | Balachandran | ....... | H04W 88/02 370/313 |
| 2005/0123102 A1 * | 6/2005 | Beason et al. | ............ | 379/45 |
| 2005/0131889 A1 * | 6/2005 | Bennett | ............ | G06F 17/30398 |
| 2005/0143095 A1 * | 6/2005 | Jacob | ............ | 455/456.3 |
| 2005/0207552 A1 * | 9/2005 | Bodnar et al. | ............ | 379/201.01 |
| 2006/0072724 A1 * | 4/2006 | Cohen et al. | ............ | 379/93.25 |
| 2006/0168259 A1 * | 7/2006 | Spilotro et al. | ............ | 709/229 |
| 2007/0003050 A1 * | 1/2007 | Ebling et al. | ............ | 379/265.02 |
| 2007/0075995 A1 * | 4/2007 | Reichard | ............ | G06T 19/00 345/419 |
| 2007/0165812 A1 * | 7/2007 | Lee et al. | ............ | 379/201.01 |
| 2008/0043976 A1 * | 2/2008 | Maximo et al. | ............ | 379/220.01 |
| 2008/0286741 A1 * | 11/2008 | Call | ............ | 434/350 |

\* cited by examiner

*Primary Examiner* — Joseph J Nguyen
(74) *Attorney, Agent, or Firm* — Timothy X. Gibson, Esq.; Gibson & Dernier LLP

(57) ABSTRACT

Methods and apparatus for customizing a telephone are disclosed in which preferred communication services are conveniently accessible to a user, in which a telephone is tailored to the specific requirements of a user.

21 Claims, 6 Drawing Sheets

SYSTEM AND METHOD TO CUSTOMIZE A TELEPHONE

FIELD OF THE INVENTION

This invention relates generally to telecommunications, and more specifically to a method to customize a telephone.

BACKGROUND OF THE INVENTION

With the convergence of voice and data networks and the integration of corresponding services, the usage of a telephone is no long confined to conversational communication. A telephone allows a user to use many services including personal communication services, such as telephone services, conference services, voice messaging services, and directory services, such as yellow page services. Telephones also permit access to and use of information services, such as stock quote services, weather services, traffic condition services and the like; commercial services, such as fund transfer services, movie ticketing services or merchandise ordering services; to purchase products or services; conduct financial or banking transactions; obtain healthcare advice, healthcare provider referrals, or for "hotline" connection to his/her doctors or nurses, to name just a few.

A typical telephone has a display panel and navigation keys to help a user to find and use a service. Due to the many available services, the user often has to navigate through many menu displays in order to find a desired service.

The proliferation of the number of communication services available via telephone creates a new problem for a user.

In one example, a parent with small children might typically use his telephone for several communication services relating to parenthood and schooling, such as obtaining school activity information, and quite regularly contacting a pediatric consultation service for childcare questions. Each time he tries to use one of these communication services, he must fumble through several levels of display menu in order to find it.

In another example, a senior citizen living alone might often use communication services relating to a senior person, such as phoning a pharmacy, an elderly healthcare inquiry service, and a hotline service for medical problems. In a similar fashion, this user must go through multiple navigation steps to find the service she needs. This is particularly troublesome when she has a medical emergency and needs to use the hotline service, but is unable to locate it in the complex menu.

In another example, a company might offer various communication services for its employees with different responsibilities. For instance, a receptionist's often-used communication services include a company directory service, and a service that provides up-to-date business information for enquiry purpose; an office administrator's often-used communication services includes a yellow page service and a business travel reservation service; and a manager's often-used communication services includes a conferencing service and a service that provides ongoing project status. It is important for employees with different responsibilities to be able to conveniently access their often-used communication services without having to fumble through complex menus.

Therefore, there is a need to provide a method to customize a communication device with often-used communication services reflecting a role of a user, and devices so customized.

SUMMARY OF THE INVENTION

Devices customized to include communication services reflecting the role of a user are provided, and methods of providing same.

In one aspect a communication device is provided that can access a communication service over a communication network such as but not limited to a telephone network, an Internet Protocol network, a wide area network, local area network, a Virtual Private Network, a wired network, and a wireless network. The communication network may be a telephone network selected from a Public Switched Telephone Network, a corporate telephone network and a Voice over IP network; a General Packet Radio Service network, a Global System for Mobile Communications network, a WiFi network, a Code Division Multiple Access One network, a CDMA2000 network, a Wideband Code Division Multiple Access network, a third-generation network, a CDMA 1x Evolution-Data Optimized network, a High-Speed Downlink Packet Access network, and an Enhanced Data Rates for GSM Evolution network.

In one embodiment a communication device in accordance with the present invention includes a capsule associated therewith that can store information relating to the user and/or a communication service that could be associated with a user of the communication device. The capsule may include a data file stored in a telephone, programming logic in the telephone or the like.

In one embodiment the capsule includes at least one user role description and at least one preferred communication service associated with the at least one user role. Preferably, the communication device has associated therewith means for a user to select and use preferred communication services, such as but not limited to an input module and/or an output module. In another embodiment the information is preselected and stored in the phone at manufacture or by a retailer.

In another embodiment a communication device in accordance with the invention has associated therewith a capsule updater and/or a service updater.

Methods for tailoring a telephone to a user are disclosed in which a communication service is associated with at least one attribute of a user. In one embodiment, information accessible by the telephone is stored, wherein the information identifies at least one communication service and user information. In one embodiment the storage is achieved by inputting information into a capsule associated with the communication device.

In another aspect, the invention includes a method of establishing a communication connection between a communication device and a preferred communication service based on at least one attribute of a user, including providing a communication device associated with a data storage means including user information and a preferred communication service and initiating a communication session with the preferred communication service through a communication service provider. In one embodiment the communication session is initiated based on the time of day. The communication session may be a voice or data session. In accordance with one aspect data is retrieved by the communication device retrieving from the data storage means, wherein the information is applicable to the preferred communication service. The data is sent over a communication session to preferred communication service provider.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE INVENTION

In the following description, for the purposes of explanation, specific numbers, materials and configurations are set forth in order to provide a thorough understanding of the invention. It will be apparent, however, to a person of ordinary skill in the art, that these specific details are merely exemplary embodiments of the invention. In some instances, well known features may be omitted or simplified so as not to obscure the present invention. Furthermore, reference in the specification to "one embodiment" or "an embodiment" is not meant to limit the scope of the invention, but instead merely provides an example of a particular feature, structure or characteristic of the invention described in connection with the embodiment. Insofar as various embodiments are described herein, the appearances of the phase "in an embodiment" in various places in the specification are not meant to refer to a single or same embodiment.

Figure 1:
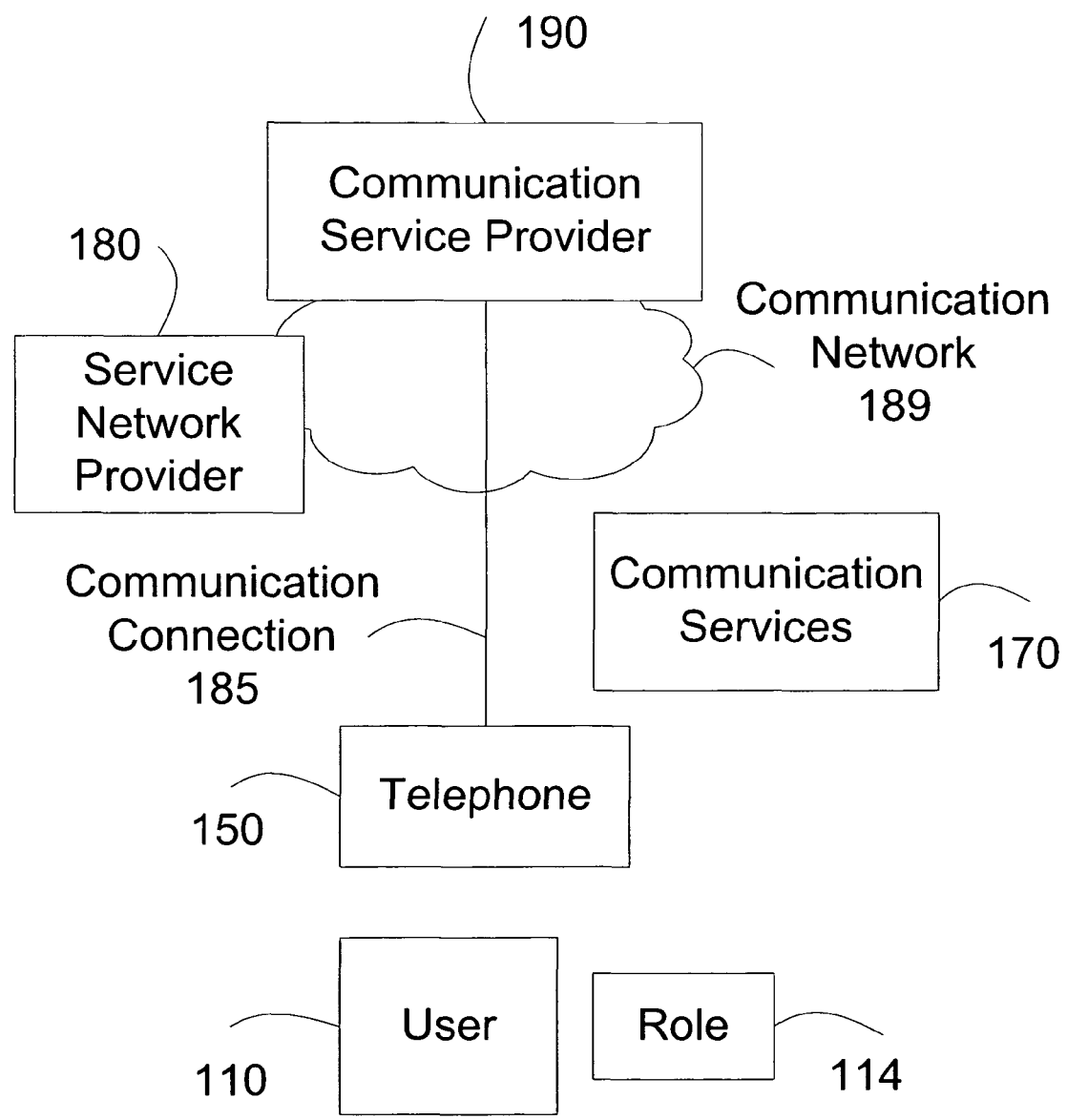
FIG. 1 illustrates a simplified block diagram of communication services accessible by a communication device in accordance with one embodiment of the present invention.

With reference to the drawings, wherein like numerals indicate like elements, there is shown in FIG. 1 in accordance with at least one embodiment, a simplified block diagram depicting a user 110, a role 114, a telephone 150 and communication services 170 accessible via telephone 150.

In accordance with at least one embodiment, communication services 170 may be selected from a local telephone service or a long distance telephone service, a voice message service, an Instant Message (IM) based or a Voice over IP based voice service, a commercial transaction service, such as but not limited to a ticketing service or a phone banking service, a group call service, a hot-line telephone service, a directory service, a yellow page service, a reminder service, such as an automatic wakeup call service, a conference call reminder, or an appointment reminder service; an information service, such as a news headlines service, a local weather report service, a road condition service, a stock quote service; or an emergency alert service, such as a flood warning service or a child abduction alert service. It will be apparent to those having skill in the art a wide range of services can be considered communications services 170 in accordance with the teachings of the present invention.

User 110 uses telephone 150 for a communication service 170. In one embodiment the communication service 170 is a preferred communication service and is conducted over a communication connection 185 between telephone 150 and a communication service provider 190 over a communication network 189. Communication network 189 is operated by a service network provider 180.

In accordance with one embodiment telephone 150 contains programming or is adapted to be programmed such that it is "tailored" to the specific requirements of a particular user 110. By way of illustration the term "tailored" herein can mean at least one preferred communication service 170 is associated with user 110. The communication service 170 may be associated with a role or attribute of a user 110.

In accordance with at least one embodiment, user 110 has attributes that can be defined as a role 114. Communication services 170 are tailored to role 114 in accordance with the methods described herein, resulting in at least one preferred communication service 170 being associated with the role 114 of user 110.

By way of example, role 114 may be a social role, such as the role of a parent, a student, a home owner, an apartment tenant, a hotel guest or a senior citizen; a business role, such as the role of an office worker, a traveling salesman, an office worker for insurance industry, a marketing manager, a real estate agent, or a software engineer for a video game company; or a role within a business organization, such as a role as a manager, a technician, a salesperson, a member of a marketing department, or a member of an accounting division, to name just a few.

In the example in which role 114 is the role of a working parent, a plurality of preferred communication services 170 might include a communication service 170 that provides morning commute information, or a bulletin board service that provides school events information.

In an example in which role 114 is the role of a young adult, a plurality of preferred communication services 170 might include a communication service 170 that provides local entertainment and restaurant information, or a dating service.

In an example in which role 114 is the role of a housewife, a plurality of preferred communication services 170 might include a phone banking service, or a service that provides childcare information and pediatric advices.

In an example in which role 114 is the role of a high school student, a plurality of preferred communication services 170 might include a group chat service for youngsters or a service that provides home work advice.

In an example in which role 114 is the role of a hotel guest, a plurality of preferred communication services 170 might include an automatic wakeup call service, or a reservation service for hotel restaurants or shows.

In an example in which role 114 is the role of an office worker, a plurality of preferred communication services 170 might include a corporate voice messaging service, or a corporate conferencing service.

In an example in which role 114 is the role of a senior citizen, a plurality of preferred communication services 170 might include an interactive service that provides healthcare information and advice, or a medical emergency service.

In an example in which role 114 is the role of a fan of a professional basketball team, a plurality of preferred communication services 170 might include a service that provides sports score update for the team, or a match ticketing service for the team.

In an example in which role 114 is the role of a parishioner of a church, a plurality of preferred communication services 170 might include a service that provides diocese event information and charity work inquiry or a service for spiritual advice provided by diocese clergymen.

Telephone 150 may include any suitable communication device such as but not limited to land line, cellular and satellite telephones, PDAs and the like available from well known manufacturers. Telephone 150 may include typical features such as but not limited to a display panel adapted to display items including text and/or graphics, function keys and the like (not shown).

Service network provider 180 may be selected from a variety of service provider types such as but not limited to a residential telephone service provider, a cellular telephone service provider, a corporate communication service department, a hotel communication service department, a centrex service provider or an IP centrex service provider, a mobile virtual network provider (MVNO) or a value-added service provider, a voice over IP (VoIP) service provider or an Instant Message (IM) based voice service provider.

In accordance with at least one embodiment, communication network 189 includes a telephone network, such as but not limited to a Public Switched Telephone Network (PSTN), a corporate telephone network or a Voice over IP (VoIP) network. Communication network 189 may include an Internet Protocol (IP) network, a wide area network (WAN) or local area network (LAN), the Internet, a corporate Virtual Private Network (VPN), a wired network, such as an Ethernet, and/or a wireless network, such as a General Packet Radio Service (GPRS) network, a Global System for Mobile Communications (GSM) network, or a WiFi network. Further examples of a communication network 189 include a Code Division Multiple Access One (cdmaOne) network, CDMA2000 network, Wideband Code Division Multiple Access (W-CDMA) network, third-generation (3G) network, CDMA 1× Evolution-Data Optimized (1×EV-DO) network, High-Speed Downlink Packet Access (HSDPA) network, and Enhanced Data Rates for GSM Evolution (EDGE) network.

Communication connection 185 includes voice and/or data communication capability. In one embodiment, communication connection 185 allows a voice conversation between user 110 and communication service provider 190 and/or data information exchange between user 110 and communication service provider 190. In one embodiment, the data information includes text, image, video, or animation. For example, telephone 150 receives the data information from communication service provider 190 and displays the data information on a telephone display panel. In one embodiment, telephone 150 receives input from user 110 via a telephone input device such as dialpad, keyboard, navigation keys, stylus, or speaker. Telephone 150 sends data information to communication service provider 190 based on the user input.

By way of example communication service provider 190 may be a web server, a (Wireless Application Protocol) WAP gateway, a File Transfer Protocol (FTP) server, a media server or an application layer gateway. Communication service provider 190 may include a service representative in which case the voice conversion is preferably between user 110 and the service representative. In another embodiment, communication service provider 190 includes an interactive voice system, such as a voice messaging system or an interactive voice response (IVR) system, in which case the voice conversation is preferably between user 110 and the interactive voice system. In another embodiment, communication service provider 190 includes a conference bridge; the voice conversation is between user 110 and another user or users of communication network 189 over the conference bridge. In another embodiment, communication service provider 190 includes a collaboration system with voice functionality; the voice conversation is between user 110 and another user or users over the collaboration system. In another embodiment, communication service provider 190 includes an Instant Messaging system with voice functionality; the voice conversation is between user 110 and another user or users over the Instant Messaging system. In another embodiment, communication service provider 190 includes a peer to peer based collaboration system; the voice conversation is between user 110 and another user or users of the peer to peer collaboration system.

A communication service provider 190 may be considered a preferred communication provider 190 when associated with a preferred communication service 170.

Figure 2:
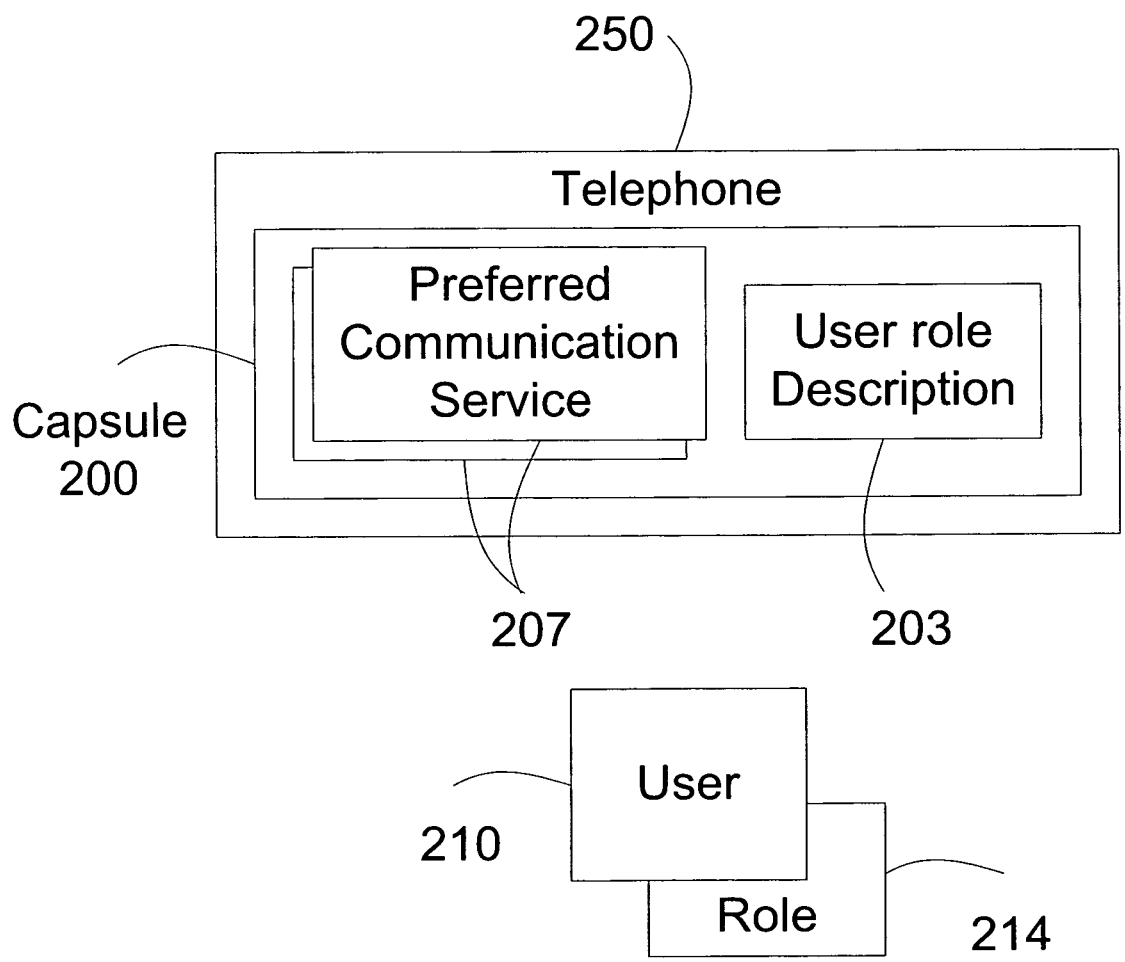
FIG. 2 illustrates a simplified block diagram of a telephone in accordance with one embodiment of the present invention.

Now referring to FIG. 2 in an alternate embodiment a telephone 250 includes a capsule 200. Capsule 200 may be in the form of a data file stored in telephone 250. Capsule 200 may be included in programming logic in telephone 250. Capsule 200 includes a user role description 203 and at least one preferred communication service 207 associated therewith. User role description 203 contains user information describing the role 214 of user 210. The preferred communication services 207 are tailored to the role 214 described by user role description 203.

In one example, and referring to FIGS. 1 and 2, the tailoring of communication services is achieved wherein telephone 250 is employed to allow user 210 to use communication services 170. A service provider or a telephone seller, based on user role description (e.g., role of senior citizens), selects (or tailors) the preferred communication service 207 (a subset of the 170 communication services); and store the preferred communication services 170 in capsule 200.

In another embodiment, telephone 250 is adapted to accept user input (such as pressing a "senior citizen" button), to modify capsule 200 with new preferred communication services 207 tailored to the selected role.

In one embodiment, user information is provided pre-loaded in capsule 200, for example, as a manufacturing pre-installation, or as a pre-sale configuration prepared for example by a phone retailer or technician. In another embodiment, the telephone 250 accepts personal information from a user, and stores the personal information in capsule 200.

In one embodiment, user role description 203 includes at least one role 214 attribute, such as but not limited to age range, gender, profession, group or community affiliation, grade level in a business organization, job function, and/or organization position. In one embodiment a preferred communication service 207 in capsule 200 is tailored to at least one role 214 attribute in user role description 203. The role 214 attribute is said to be applicable to the preferred communication service 207. In another embodiment, a role 214 attribute is applicable to all preferred communication services in capsule 200. In one embodiment, a role 214 attribute is applicable to some but not all preferred communication services 207 in capsule 200.

Figure 3:
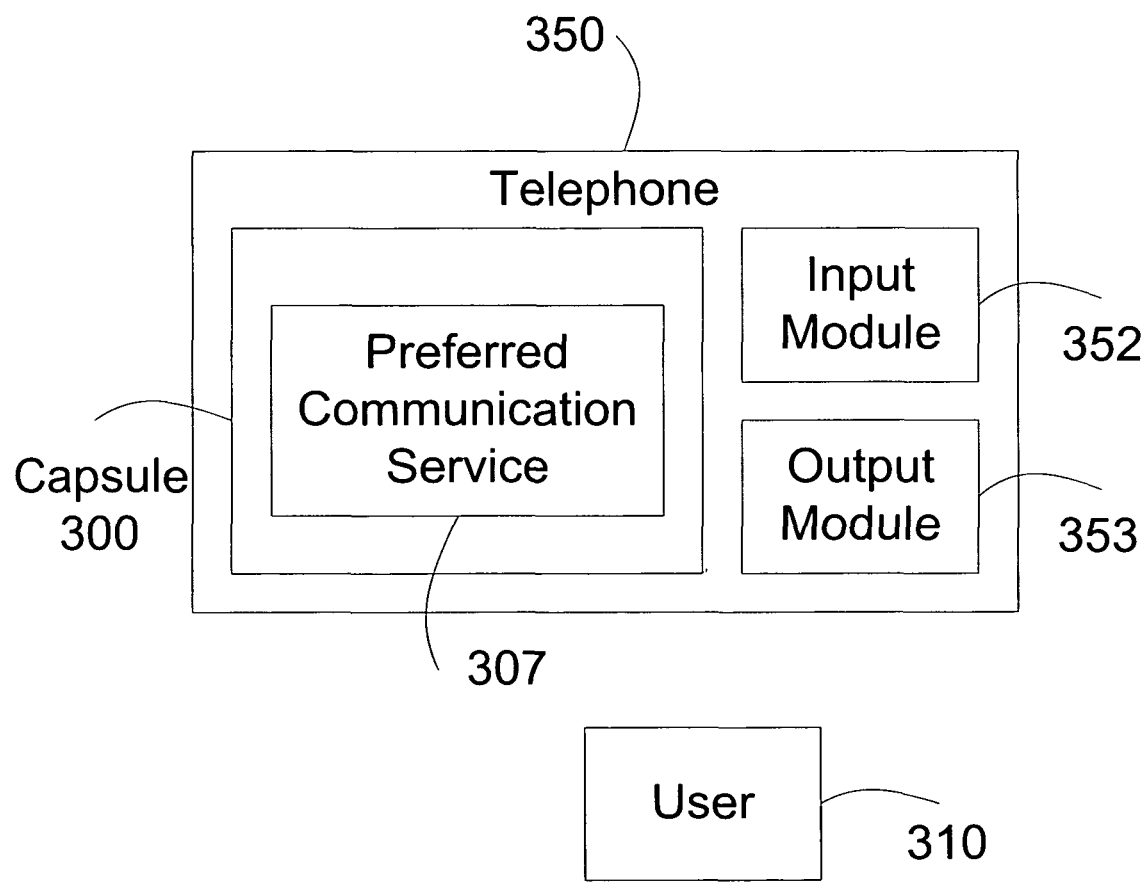
FIG. 3 illustrates an exemplary embodiment of a telephone in accordance with one embodiment of the present invention.

Now referring to FIG. 3 telephone 350 includes capsule 300. Capsule 300 is tailored for user 310 and includes at least a preferred communication service 307. Telephone 350 includes an input module 352 and an output module 353 and displays capsule 300 to user 310 by providing means for user 310 to select and use preferred communication services 307.

Telephone 350 displays capsule 300 by presenting information about preferred communication service 307 as described above.

In one embodiment, input module 352 may include a dialpad, navigation keys, a keyboard, a stylus and/or a touchscreen. Thus equipped telephone 350 allows user 310 to use input module 352 to select and use preferred communication service 307 in conjunction with the displayed information.

Telephone 350 presents information about preferred communication service 307 via output module 353. In one embodiment, output module 353 includes a display panel and displays information about preferred communication service 307 on the display panel. In one embodiment the output module is a graphical user interface (GUI). The information may include a textual or graphical representation of preferred communication service 307. The information may include for example an operational manual for preferred communication service 307.

In another embodiment, output module 353 is or includes a speaker. Telephone 350 announces information about preferred communication service 307 over the speaker.

In one embodiment, input module 352 includes a microphone. Telephone 350 allows user 310 to select and use preferred communication service 307 via a voice command over the microphone. In one embodiment telephone 350 includes a voice processing module (not shown) as known to those skilled in the art that converts voice signals captured at the microphone into a voice command. In one embodiment, the voice processing module matches the voice signals to a plurality of voice tags, wherein a voice tag is associated with a voice command. The voice processing module selects a matched voice tag which selects the appropriate preferred communication service 307 to be accessed.

In accordance with one embodiment, output module 353 is adapted to reveal or display capsule 300 based on various operations. For example, in one embodiment, telephone 350 is adapted to reveal capsule 300 at power up time. In another embodiment, telephone 350 reveals capsule 300 at a time when telephone 350 "wakes up" from a power saving mode. In another embodiment, telephone 350 reveals capsule 300 when telephone 350 detects user activity from input module 352, such as for example when a touchscreen is being touched, or a key is being pressed. In one embodiment, telephone 350 includes a plurality of capsules 300.

In one embodiment, one or more capsules 300 are stored in telephone 350 by a the manufacturer of the telephone 350. In one embodiment, the telephone manufacturer pre-selects a capsule 300 in a manufactured telephone 350. For example, a telephone 350 includes a pre-selected capsule 300 tailored for the role of a college student. In another example, a telephone 350 includes a pre-selected capsule 300 for use by hotels in which the pre-selected capsule 300 is tailored to the role of a hotel guest. In another example, a telephone 350 is manufactured for a value added service provider catering to the elderly population, in which the pre-selected capsule 300 is tailored to the role of a senior citizen.

In another embodiment, a service network provider 180 stores a plurality of capsules 300 in a telephone 350. In accordance with at least one embodiment, the service network provider 180 pre-selects a capsule 300 in the telephone 350.

In one embodiment, telephone 350 provides means for user to select a capsule 300 from a plurality of capsules 300 stored in telephone 350. For example, after purchasing a telephone 350, a user selects a first capsule 300 tailored for the role of a housewife. A few months later, the user selects a second capsule 300 tailored for the role of a young parent.

Figure 4:
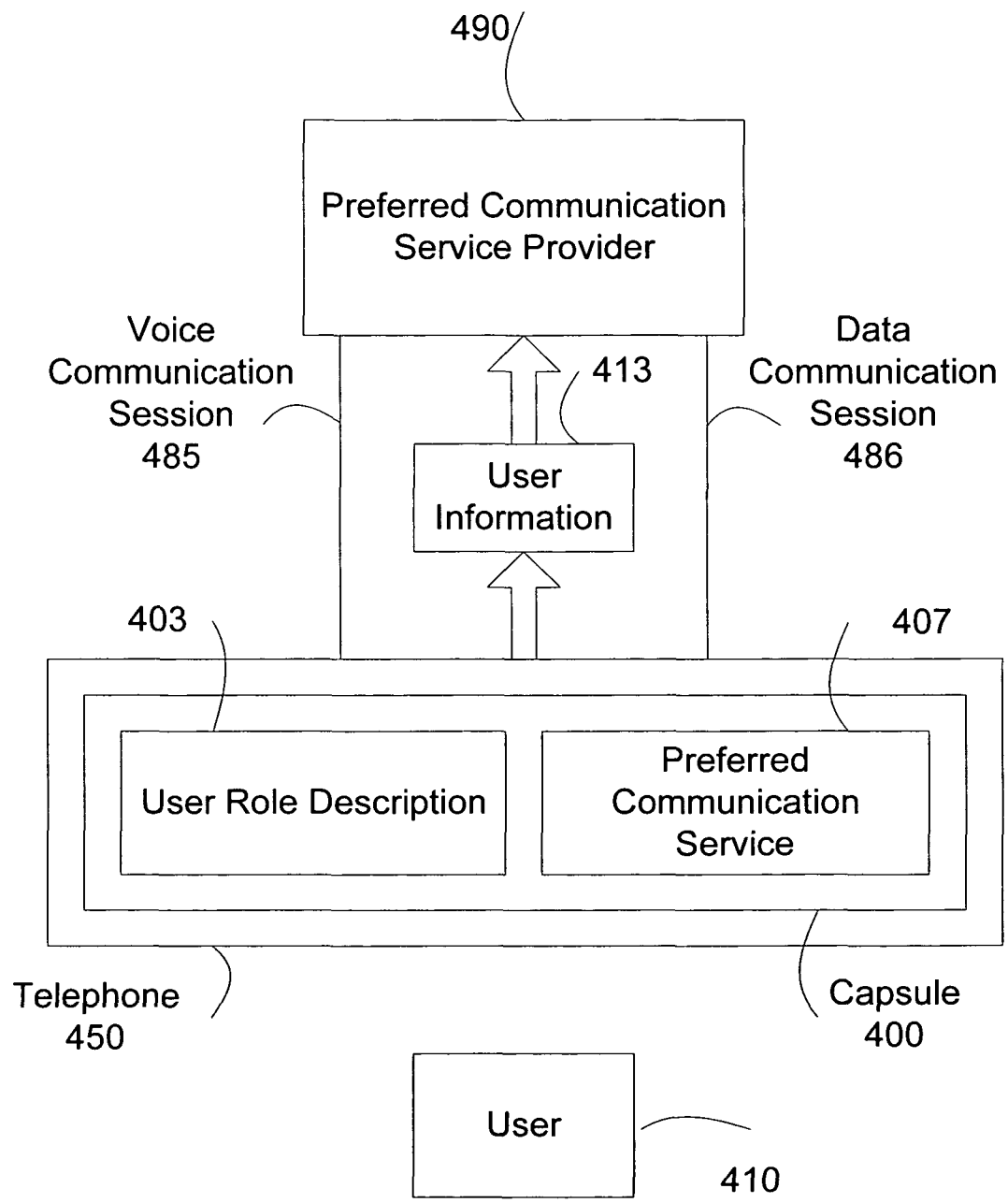
FIG. 4 illustrates an exemplary method in accordance with one embodiment of the present invention.

Now referring to FIG. 4 a method of using a preferred communication service 407 is disclosed. Telephone 450 includes capsule 400. Capsule 400 includes user role description 403, and a preferred communication service 407. Telephone 450 initiates a communication connection with preferred communication service provider 490 for preferred communication service 407.

In one embodiment, telephone 450 receives user input from user 410 for using preferred communication service 407. In this embodiment, the preferred communication service has already been tailored to the role, as described hereinabove. Telephone 450 initiates the communication connection with preferred communication service provider 490.

In another embodiment, telephone 450 automatically initiates the communication connection with preferred communication service provider 490. In one embodiment, telephone 450 includes a clock function (not shown) as is known in the art, and telephone 450 automatically initiates the communication connection based on a scheduled time. The time schedule can be pre-set within the capsule 400 and associated with the preferred communication service 407. In one embodiment, telephone 450 accepts user input (such as pressing a "senior citizen" button"), and modifies capsule 400 with new preferred communication services 407 tailored to the selected role.

For example, preferred communication service 407 is an information service that provides morning news, local weather and traffic condition; and the scheduled time is 6:30 am on weekdays. Telephone 450 automatically initiates the communication connection for the information service after 6:30 am on weekdays.

In another embodiment, telephone 450 initiates the communication connection by establishing a voice communication session 485 with preferred communication service provider 490. User 410 and preferred communication service provider 490 talks over voice communication session 485. For example, preferred communication service 407 provides pediatric advice. User 410 obtains the pediatric advice offered by an on-duty nurse or a healthcare professional over voice communication session 485.

In another embodiment, telephone 450 initiates the communication connection by establishing a data communication session 486 with preferred communication service provider 490. Preferred communication service 407 may include voice capabilities. In one embodiment, during the data communication session 486, telephone 450 receives an indication to use the voice capability of preferred communication service 407. In one embodiment, telephone 450 receives the indication from user 410 via input module such as a key, touchpad or the like. Telephone 450 establishes voice communication session 485 with preferred communication service provider 490. For example, preferred communication service 407 is a movie ticketing service. Telephone 450 establishes a data communication session 486 with a movie ticketing service website. User 410 glances over several movie video clips over data communication session 486. A movie video clip includes a voice capability selection to invoke a voice communication session 485 with a service representative of the movie ticketing service. User 410 is ready to purchase movie tickets of a movie. User 410 invokes the voice capability selection. Telephone 450 establishes a voice communication session 485 with movie ticketing service. User 410 talks with a service representative to purchase two movie tickets.

In yet a further embodiment, telephone 450 sends user information 413 over the communication connection. In one embodiment, user role description includes user information 413 such as but not limited to personal information of a user. Telephone 450 sends user information 413 applicable to a preferred communication service 407 to the preferred communication service provider 490 for the preferred communication service 407. In one embodiment, user information 413 includes user identity, such as a user name, guest name, employee number, or subscriber name; age; location, such as the name of a city, a state, or a metropolitan area; language preference, interest, hobbies, cultural or ethnical affiliation; and authentication information.

Telephone 450 retrieves from user role description 403 a role attribute applicable to preferred communication service 407. Telephone 450 sends the retrieved role attributes in user information 413. In one embodiment, telephone 450 sends user information 413 over voice communication session 485.

In one example, telephone 450 sends the user information 413 in Dial Pulse Multiple Frequency (DTMF) digits. In another example, telephone 450 sends user information 413 in a Session Initiation Protocol (SIP) INVITE message. In one more example, telephone 450 sends user information 413 in a SIP INFO message. In one embodiment, telephone 450 sends user information 413 over data communication session 486. In one example, telephone 450 sends user information 413 in a cookie header of a Hypertext Transfer Protocol (HTTP) request. In one example, telephone 450 sends user information 413 in an HTTP POST request. In one example, telephone 450 sends user information 413 using an application level messaging protocol.

In one example, preferred communication service 407 is a restaurant reservation service. User information 413 includes an age of 64 plus years old. User 410 receives the reservation service with discount promotion for senior citizens.

In one example, preferred communication service 407 is a service provided by a profession hockey league. User information 413 includes a team affiliation. User 410 receives the league service customized to the team affiliation, such as matching ticketing, score update or memorabilia purchasing for the team.

In one example, preferred communication service 407 is a dating service. User information 413 includes a male gender. User 410 receives the dating service customized to the male gender, such as member profile, events and activities or match making geared towards the male gender.

In one example, preferred communication service 407 is a conference service for a corporation. User information 413 includes a grade level of "5" within the corporation. User 410 receives the conference service customized to the grade level of "5", such as a multi-media conferencing service for grade level of "5" and above.

Figure 5:
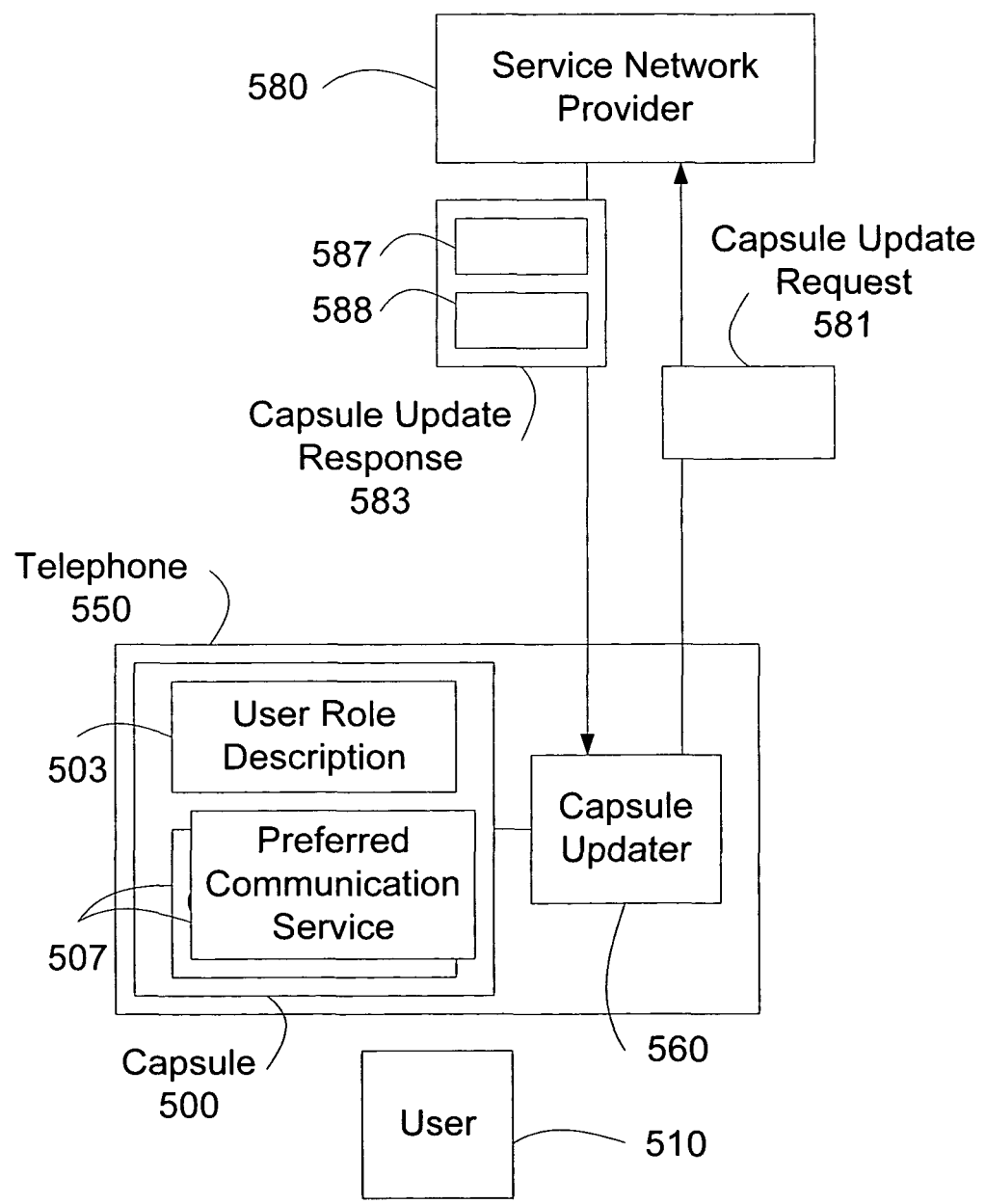
FIG. 5 illustrates an exemplary method in accordance with one embodiment of the present invention.

FIG. 5 depicts an embodiment of a method to modify a capsule 500 by a service network provider 580. Telephone 550 includes capsule 500 and optionally capsule updater 560. Capsule 500 includes user role description 503 and at least one preferred communication service 507. Capsule updater 560 connects to capsule 500 which may be integral with or a separate unit from telephone 550. In one embodiment, capsule updater 560 is a software program module. In one embodiment, telephone 550 includes capsule updater 560.

Capsule updater 560 connects to service network provider 580 via a suitable communication connection through telephone 550. Capsule updater 560 retrieves user role description 503 from capsule 500. In one embodiment, capsule updater 560 retrieves user role description 503 from telephone 550 directly, such as over an application programming interface. In one embodiment, capsule updater 560 retrieves user role 503 from telephone 550 over communication network.

Capsule updater 560 sends to service network provider 580 a capsule update request 581 that includes the retrieved user role description 503.

Capsule updater 560 receives a capsule update response 583 from service network provider 580. In one embodiment, capsule update response 583 includes at least one preferred communication service 587. Capsule updater 560 matches the preferred communication service 587 with the preferred communication service(s) 507 stored in capsule 500. In one embodiment, capsule updater 560 determines that there is no match for received preferred communication service(s) 587 and capsule updater 560 stores the received preferred communication service(s) 587 in capsule 500.

In another embodiment, capsule update response 583 includes a role attribute 588 that is applicable to preferred communication service 587. Capsule updater 560 stores role attribute 588 into capsule 500 preferably only to the extent an identical role attribute is not already stored in capsule 500.

In one embodiment, service network provider 580 modifies capsule 500 at a scheduled time, for example, every week, every other day, or once a month. In one embodiment, service network provider 580 modifies capsule 500 at random time. In one embodiment, service network provider 580 modifies capsule 500 as a result of a user request.

Figure 6:
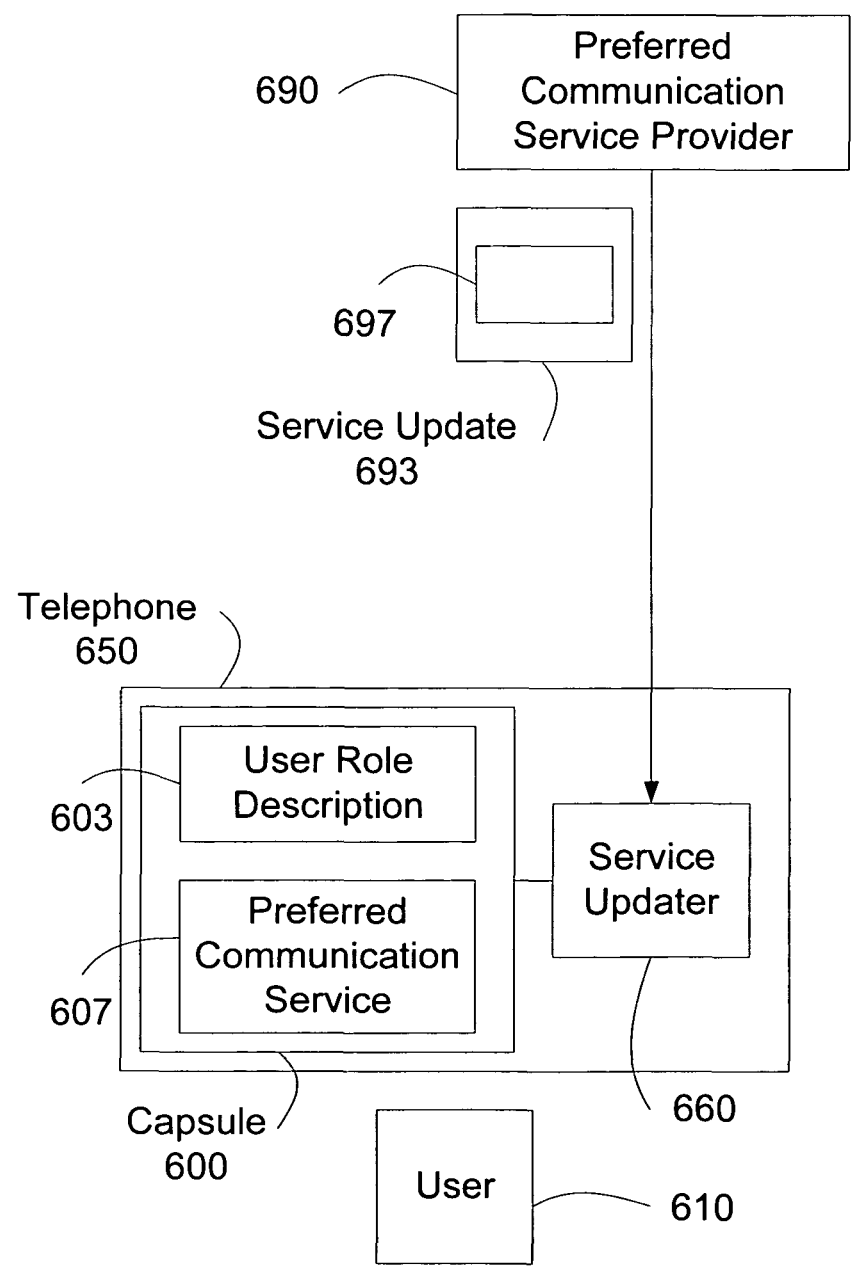
FIG. 6 illustrates an exemplary method in accordance with one embodiment of the present invention.

FIG. 6 illustrates a process to modify a preferred communication service by preferred communication service provider.

Telephone 650 includes capsule 600. Capsule 600 include user role description 603 and a preferred communication service 607. Preferred communication service provider 690 modifies preferred communication service 607. In one embodiment, telephone 650 optionally includes service updater 660. Capsule 600 connects to a service updater 660.

Service updater 660 communicates with preferred communication service provider 690. Service updater 660 in one embodiment is a software program module that communicates with preferred communication service provider 690, and modifies applicable user role description 603 of a preferred communication service 607. Service updater 660 receives a service update 693 from preferred communication service provider 690. This is analogous to software upgrade/update such as a Windows™ update prompted by the Windows™ manufacturer. In one embodiment, service updater 660 sends a service update request and receives service update 693 as a response.

Service update 693 includes a role attribute 697 that is applicable to preferred communication service 607. Service updater extracts role attribute 697 from service update 693 and stores the retrieved role attribute in user role description 603.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A telephone capable of being tailored to the needs of a user of the telephone comprising a capsule operable to store a plurality of user role descriptions comprising information relating to a user of the telephone, which information describes the role of the user, wherein each user role description is associated with a time of day, and to store a plurality of preferred communication services, wherein each of the plurality of preferred communication services is associated with a corresponding one of the plurality of user role descriptions wherein the telephone is operable to permit input in the capsule of the plurality of user role descriptions and the plurality of preferred communication services associated with the corresponding one of the plurality of user role descriptions, and the telephone is further operable to access and automatically initiate a communication connection with and make available to the user a preferred communication service based on the time of day via a communication connection between the telephone and a communication service provider selected from the group consisting of a web server, a Wireless Application Protocol (WAP) gateway, a File Transfer Protocol (FTP) server, a media server and an application layer gateway over a communication network operated by a service network provider, wherein each of the plurality of preferred communication services is selected from the group consisting of a commercial transaction service, a ticketing service, a phone banking service, a group call service, a hotline telephone service, a directory service, a yellow page service, a reminder service, an automatic wakeup call service, a conference call reminder service, an appointment reminder service, an information service, a news headlines service, a local weather report service, a road condition service, a morning commute information service, a bulletin board service which provides school event information, a dating service, an entertainment information service, a restaurant information service, a restaurant reservation service, a stock quote service, an emergency alert service, a flood warning service, a child care information service, a pediatric advice information service, a healthcare information service, a medical emergency service, a group chat service, a homework advice service, a hotel reservation service, a hotel show reservation service, a sports score information service, a sports information service, a diocese information service, a spiritual advice service, a charity information service and a child abduction alert service.

2. The invention of claim 1 wherein the communication network is selected from a telephone network, an Internet Protocol network, a wide area network, a Virtual Private Network, a wired network, and a wireless network.

3. The invention of claim 1 wherein the communication network is a telephone network selected from a Public Switched Telephone Network, a corporate telephone network and a Voice over IP network.

4. The invention of claim 1 wherein the communication network is selected from a General Packet Radio Service network, a Global System for Mobile Communications network, a WiFi network, a Code Division Multiple Access One network, a CDMA2000 network, a Wideband Code Division Multiple Access network, a third-generation network, a CDMA 1x Evolution-Data Optimized network, a High-Speed Downlink Packet Access network, and an Enhanced Data Rates for GSM Evolution network.

5. The invention of claim 1 the capsule comprising at least one data file stored in the telephone.

6. The invention of claim 1 the capsule comprising programming logic in the telephone.

7. The invention of claim 1 said telephone further comprising means for a user to select and use preferred communication services.

8. The invention of claim 7 said means comprising an input module and an output module.

9. The invention of claim 1 further comprising a capsule updater.

10. The invention of claim 1 further comprising a service updater.

11. The invention of claim 1 wherein at least two of the user role descriptions are associated with the same preferred communication service and the time of day is different.

12. A method for tailoring a telephone to a user comprising providing a telephone with a capsule operable to store a plurality of user role descriptions comprising information relating to a user of the telephone, which information describes the role of the user, wherein each user role description is associated with a time of day, and to store a plurality of preferred communication services, wherein each of the plurality of preferred communication services is associated with a corresponding one of the plurality of user role descriptions, inputting in the capsule the plurality of user role descriptions and the plurality of preferred communication services associated with the corresponding one of the plurality of user role descriptions, and providing the telephone with operability to access and automatically initiate a communication connection with and make available to the user a preferred communication service based on the time of day, via a communication connection between the telephone and a communication service provider selected from the group consisting of a web server, a Wireless Application Protocol (WAP) gateway, a File Transfer Protocol (FTP) server, a media server and an application layer gateway over a communication network operated by a service network provider, wherein each of the plurality of preferred communication services is selected from the group consisting of a commercial transaction service, a ticketing service, a phone banking service, a group call service, a hotline telephone service, a directory service, a yellow page service, a reminder service, an automatic wakeup call service, a conference call reminder service, an appointment reminder service, an information service, a news headlines service, a local weather report service, a road condition service, a morning commute information service, a bulletin board service which provides school event information, a dating service, an entertainment information service, a restaurant information service, a restaurant reservation service, a stock quote service, an emergency alert service, a flood warning service, a child care information service, a pediatric advice information service, a healthcare information service, a medical emergency service, a group chat service, a homework advice service, a hotel reservation service, a hotel show reservation service, a sports score information service, a sports information service, a diocese information service, a spiritual advice service, a charity information service and a child abduction alert service.

13. The method of claim 12 comprising providing the telephone with an input module for inputting at least one of the user role information or the preferred communication services.

14. The method of claim 12 wherein at least two of the user role descriptions are associated with the same preferred communication service and the time of day is different.

15. A method of automatically establishing a communication connection between a communication device and a preferred communication service based on at least one attribute of a user of the communication device and a time of day, comprising providing the communication device with a capsule operable to store a plurality of user role descriptions comprising information relating to a user of the telephone, which information describes the role of the user, wherein each user role description is associated with a time of day, and to store a plurality of preferred communication services associated with a corresponding one of the plurality of user role descriptions, inputting in the capsule the plurality of user role descriptions and the plurality of preferred communication services associated with the corresponding one of the plurality of user role descriptions and making a selected preferred communication service available to the user and automatically initiating a communication session with the selected preferred communication service based on the time of day via a communication network through a communication service provider selected from the group consisting of a web server, a Wireless Application Protocol (WAP) gateway, a File Transfer Protocol (FTP) server, a media server and an application layer gateway wherein each of the plurality of preferred communication services is selected from the group consisting of a commercial transaction service, a ticketing service, a phone banking service, a group call service, a hotline telephone service, a directory service, a yellow page service, a reminder service, an automatic wakeup call service, a conference call reminder service, an appointment reminder service, an information service, a news headlines service, a local weather report service, a road condition service, a morning commute information service, a bulletin board service which provides school event information, a dating service, an entertainment information service, a restaurant information service, a restaurant reservation service, a stock quote service, an emergency alert service, a flood warning service, a child care information service, a pediatric advice information service, a healthcare information service, a medical emergency service, a group chat service, a homework advice service, a hotel reservation service, a hotel show reservation service, a sports score information service, a sports information service, a diocese information service, a spiritual advice service, a charity information service and a child abduction alert service.

16. The method according to claim 15 wherein the communication session is a voice communication session.

17. The method according to claim 15 wherein the communication session is a data communication session.

18. The method according to claim 15 comprising retrieving from the capsule information applicable to the preferred communication service and sending the retrieved information over a communication session to a preferred communication service provider.

19. The method of claim 15 wherein at least two of the user role descriptions are associated with the same preferred communication service and the time of day is different.

20. A telephone capable of being tailored to the needs of a user of the telephone comprising a capsule operable to store a plurality of user role descriptions comprising information relating to a user of the telephone, which information describes the role of the user, wherein each user role description is associated with a time of day, and to store a plurality of preferred communication services, wherein each of the plurality of preferred communication services is associated with a corresponding one of the plurality of user role descriptions wherein the telephone is operable to permit input in the capsule of the plurality of user role descriptions and the plurality of preferred communication services associated with the corresponding one of the plurality of user role descriptions, and the telephone is further operable to access and automatically initiate a communication connection with and make available to the user a preferred communication service based on the time of day via a communication connection between the telephone and a communication service provider selected from the group consisting of a web server, a Wireless Application Protocol (WAP) gateway, a File Transfer Protocol (FTP) server, a media server and an application layer gateway over a communication network operated by a service network provider, and further comprising at least one of a capsule updater and/or a service updater.

21. The invention of claim 20 wherein at least two of the user role descriptions are associated with the same preferred communication service and the time of day is different.

* * * * *